United States Patent
Akba

(10) Patent No.: US 11,702,978 B2
(45) Date of Patent: Jul. 18, 2023

(54) SOLAR POWER GENERATING SYSTEM AND THE METHOD OF GENERATING ELECTRICITY AND PROVIDING HEAT IN SUCH A SYSTEM

(71) Applicant: OZYEGIN UNIVERSITESI, Istanbul (TR)

(72) Inventor: Tufan Akba, Istanbul (TR)

(73) Assignee: OZYEGIN UNIVERSITESI, Istanbul (TR)

(*) Notice: Subject to any disclaimer, the term of this patent is extended or adjusted under 35 U.S.C. 154(b) by 204 days.

(21) Appl. No.: 17/278,686

(22) PCT Filed: Sep. 28, 2018

(86) PCT No.: PCT/TR2018/050534
§ 371 (c)(1),
(2) Date: Mar. 23, 2021

(87) PCT Pub. No.: WO2020/068011
PCT Pub. Date: Apr. 2, 2020

(65) Prior Publication Data
US 2022/0042453 A1 Feb. 10, 2022

(51) Int. Cl.
*F02C 1/05* (2006.01)
*F02C 6/04* (2006.01)
(Continued)

(52) U.S. Cl.
CPC ............. *F02C 1/05* (2013.01); *F01D 19/00* (2013.01); *F02C 6/00* (2013.01); *F02C 6/04* (2013.01);
(Continued)

(58) Field of Classification Search
CPC .... F02C 7/26; F02C 7/268; F02C 7/27; F02C 7/275; F02C 7/277; F02C 1/04;
(Continued)

(56) References Cited

U.S. PATENT DOCUMENTS

| | | | |
|---|---|---|---|
| 2009/0173337 A1* | 7/2009 | Tamaura | F03G 6/064 126/684 |
| 2011/0283700 A1* | 11/2011 | Zohar | F01K 3/00 60/641.15 |
| 2015/0322857 A1* | 11/2015 | Ethier | F02C 6/04 290/46 |

FOREIGN PATENT DOCUMENTS

| | | | |
|---|---|---|---|
| WO | 2007023326 A1 | 3/2007 | |
| WO | WO-2016172266 A1 * | 10/2016 | ............ F03G 6/065 |
| WO | 2018140945 A1 | 8/2018 | |

* cited by examiner

*Primary Examiner* — Mark A Laurenzi
*Assistant Examiner* — Xiaoting Hu
(74) *Attorney, Agent, or Firm* — Bayramoglu Law Offices LLC

(57) ABSTRACT

A solar power generating system for generating electricity and providing heat includes; at least one generator for generating the electricity; a heating element for heating a heat transfer fluid; a turbocharger having at least one turbocharger turbine and at least one turbocharger compressor, wherein the at least one turbocharger compressor is adapted to receive and pressurize the heat transfer fluid, and the at least one turbocharger turbine is coupled to the at least one turbocharger compressor, wherein the at least one turbocharger compressor receiving and expanding a heated compressed heat transfer fluid coming from the heating element to drive the at least one turbocharger compressor and; a control unit configured to control the solar power generating system by comparing thermophysical properties obtained from more than one sensors placed in the solar power generating system with predetermined data in the control unit.

18 Claims, 5 Drawing Sheets

(51) Int. Cl.
  *F03G 6/00* (2006.01)
  *F01D 19/00* (2006.01)
  *F02C 6/00* (2006.01)
  *F02C 7/27* (2006.01)
(52) U.S. Cl.
  CPC .............. *F02C 7/27* (2013.01); *F03G 6/0055* (2021.08); *F05D 2220/30* (2013.01); *F05D 2220/40* (2013.01); *F05D 2260/85* (2013.01)
(58) Field of Classification Search
  CPC ...... F02C 1/05; F02C 1/06; F02C 1/08; F02C 1/10; F02C 1/105; F02C 6/00; F02C 6/04; F02C 6/12; F01D 19/00; F01D 15/08; F01D 15/10; F05D 2260/85; F05D 2220/30; F05D 2220/32; F05D 2220/40; F05D 2220/74; F05D 2220/76; F03G 6/064; F03G 6/068; F03G 6/0055
  See application file for complete search history.

SOLAR POWER GENERATING SYSTEM AND THE METHOD OF GENERATING ELECTRICITY AND PROVIDING HEAT IN SUCH A SYSTEM

CROSS REFERENCE TO THE RELATED APPLICATIONS

This application is the national stage entry of International Application No. PCT/TR2018/050534, filed on Sep. 28, 2018, the entire contents of which are incorporated herein by reference.

TECHNICAL FIELD

The present invention relates generally to a power generating system, and more particularly to a system and a method for producing electrical power from solar energy.

BACKGROUND

While the energy requirement increases with the development of technology, the environmental and economic cost of obtaining energy is still a big problem. Renewable energy sources stand out as being friendly to the environment. Although there is unceasing request for solar power generating system, they have always been controversial due to cost.

There are two main methods of utilizing sunlight into electricity. In the first method, solar energy is converted directly into electricity using photovoltaic (PV) cells as in the second, solar energy is utilized as a source of heat and electricity generated indirectly in a different element. Utilized heat is used for increasing enthalpy of the heat transfer fluid (HTF) or working fluid, which drives the turbine for electricity generation. To provide a high temperature heat source; solar irradiation is concentrated from a large area to a small area. This method of power generation is called concentrated solar thermal (CST) power generation. The main advantage of the solar power system is that the 'fuel' power is free, renewable making system cost effective to operate and an emission-free source.

Due to material properties, PV uses just part of the solar spectrum with high efficiency, while CST systems use the entire solar spectrum with relatively low efficiency. To overcome low efficiency problems in CST, increased concentration ratio allows to reach higher temperatures, which makes the system more efficient with respect to PV but these systems are not available for domestic scale. Producing large-scale generation is an advantage for regions using a centralized electricity distribution system; however, transmission of electricity over long distances is expensive and may lead to significant distribution losses which makes decentralized systems advantageous.

There have been several applications about a solar power generating system in such a way that normally the turbine, the compressor and the generator are always designed specifically for each project, resulting in an expensive and complicated unit. Researches prove that a single commercially available mass-produced system (i.e. car turbocharger) can be implemented to a brayton-cycle as a core engine, capable of driving the system itself for providing an option for domestic scale solution. To produce electricity by using this system, a generator can be connected to a separate turbine or directly connected to turbocharger shaft using a gearbox.

In the prior art, common failure mechanisms for turbomachines are shorter life of nozzles and turbine blades, thermal barrier coating abrasion which may also occur in gas turbines used in solar power plants that leading to more frequent maintenance and repair operations. Technical solutions the known in the art require usage of high-tech materials such as superalloys, composite-ceramics and state-of-the-art coatings that cause expensive applications.

SUMMARY

The present invention proposes a solar power generating system for generating electricity and providing heat comprising; at least one generator for electricity generation; a heating element for heating heat transfer fluid; a turbocharger having at least one turbocharger turbine and at least one turbocharger compressor, such that said turbocharger compressor is adapted to receive and pressurize the heat transfer fluid, wherein said turbocharger turbine is coupled to the turbocharger compressor, which receiving and expanding the heated compressed the heat transfer fluid coming from the heating element to drive the turbocharger compressor and, a control unit configured to control the solar power generating system by comparing physical properties and shaft speeds obtained from sensors placed in the solar power generating system with predetermined values entered into the control unit, wherein said solar power generating system further comprises said generator configured as a starter generator for supplying power to operate the solar power generating system at a start up mode wherein the start up mode is an intermediate transition stage between a stationary state of the system and a power generation mode; a power turbine in communication with at the inlet of the solar power generating system, such that said power turbine is configured to work as a compressor at start up wherein said power turbine is configured to rotate the same speed of the starter generator which is mechanically connected with said power turbine; and a compressor bypass valve for controlling the flow rate of the heat transfer fluid and routing the heat transfer fluid to the heating element by allowing the heat transfer fluid to bypass the compressor at the startup mode.

The present invention further suggests a method for generating electricity and providing heat in a solar power generating system comprising start up mode and power generating mode, wherein said start up mode further comprising the steps of; requiring electricity from a battery or grid to the starter generator to rotate the power turbine; increasing pressure of the heat transfer fluid to the power turbine configured to work as a compressor at start up mode; channeling the power turbine outlet heat transfer fluid to the heating element to increase the temperature; routing the compressed heat transfer fluid heated by the heating element to the turbocharger turbine which drives the turbocharger compressor; controlling and adjusting a flow rate of the heat transfer fluid via at least one valve continuously in the solar power generating system by the control unit; wherein said power generation mode further comprising the steps of, passing the heat transfer fluid through the power turbine which causes to the power turbine rotate; rotating the starter generator by the power turbine to generate electricity; transferring the heat transfer fluid to the turbocharger compressor for increasing the pressure; pressurizing the heat transfer fluid by the turbocharger compressor; channeling the turbocharger compressor outlet heat transfer fluid to the heating element for increasing the temperature; directing the compressed heat transfer fluid heated by the heating element to the turbocharger turbine; expanding the compressed heat transfer fluid heated by the heating element in the turbocharger turbine for driving the turbocharger compressor; controlling and adjusting a flow rate of the heat transfer fluid via at least one valve continuously in the solar power generating system by the control unit.

Primary object of the invention is to overcome the mentioned above shortcomings of the prior art.

Another object of the invention is to provide a compact power generating system having a longer working life and cost effective.

A further object of the invention is to provide a system using a turbocharger in order to decrease the overall system cost significantly.

Still a further object of the invention is to provide utilization of excess heat, which allows hot water generation if desired to use a heat exchanger or other heat transfer methods.

Other objects of the present invention will become apparent from accompanied drawings, brief descriptions of which follow in the next section as well as appended claims.

BRIEF DESCRIPTION OF THE DRAWINGS

The figures, whose brief explanations are herewith provided, are solely intended for providing a better understanding of the present invention and are as such not intended to define the scope of protection or the context in which said scope is to be interpreted in the absence of the description.

DETAILED DESCRIPTION OF THE EMBODIMENTS

Figure 1:
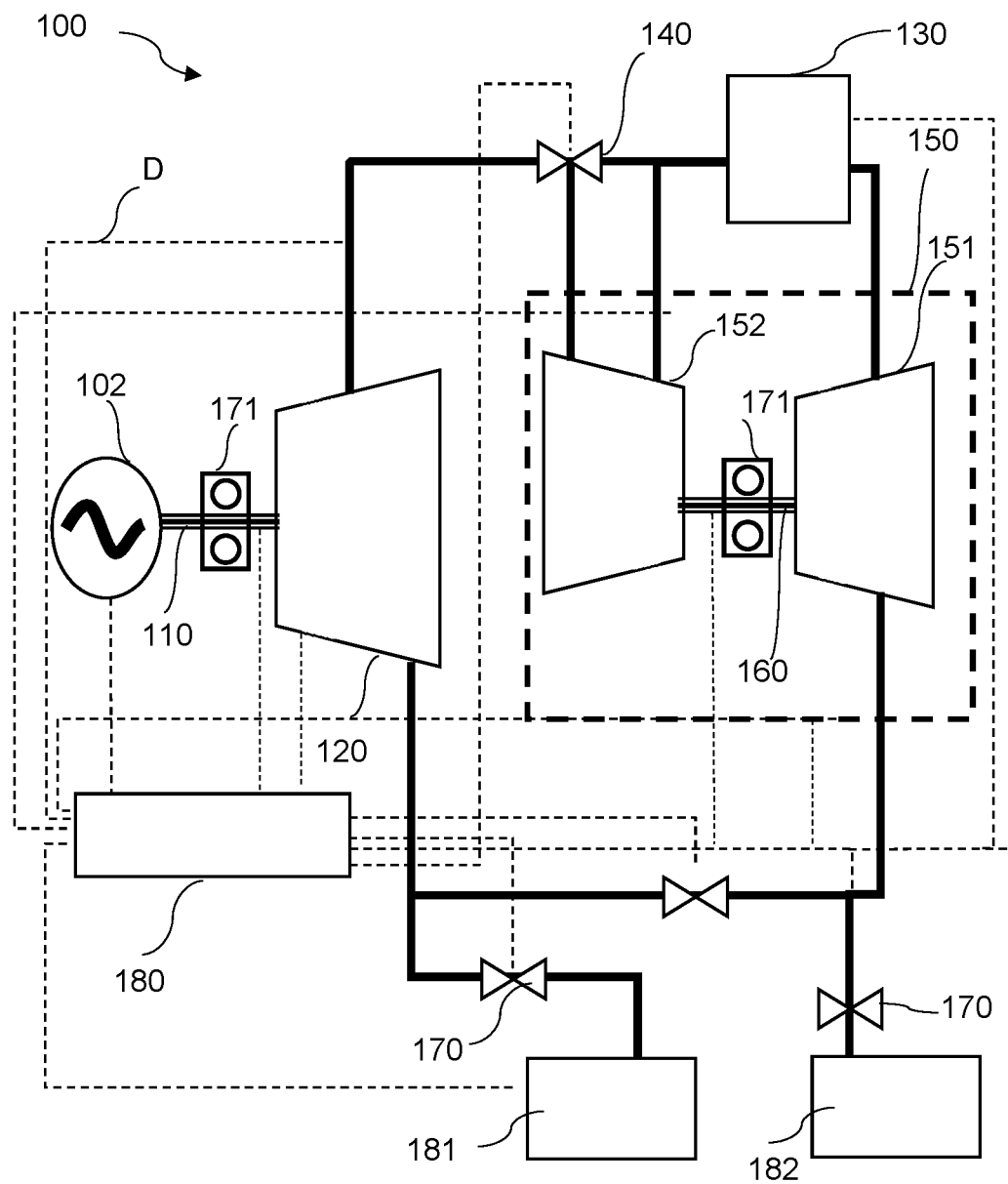
FIG. 1 illustrates a schematic view of the solar power generating system.

Hereinafter, preferred embodiments of the present invention will be described in detail with reference to the accompanying drawings which are given solely for the purpose of exemplifying embodiments according to the present invention. The list of reference numerals used in the appended drawings are as follows;

REFERENCE NUMBERS

100. Solar power generating system
102. Starter generator
110. Power generator shaft
120. Power turbine
130. Heating element
140. Compressor bypass valve
150. Turbocharger
151. Turbocharger turbine (TT)
152. Turbocharger compressor (TC)
160. Turbocharger shaft
170. Valve
171. Bearing
172. Power turbine inlet pipe
173. Heating element inlet pipe
174. Heating element outlet pipe
175. Turbocharger compressor inlet pipe
176. Turbocharger compressor outlet pipe
177. Turbocharger turbine outlet pipe
178. Recirculation pipe
180. Control unit
181. Inlet
182. Outlet
D: Dashed lines represent the transmission of data from the thermophysical (i.e. temperature, pressure, humidity, speed) sensors to control unit (180) and the signals of the commands given to the valve (170) from the control unit (180).
E: Dashed line represents the bleeding heat transfer fluid channeling by partially sending the heat transfer fluid to the turbocharger compressor inlet pipe (175) for preventing the turbocharger damage by the excess suction.

The present invention proposes a solar power generating system (100) for generating electricity and providing heat comprising at least one generator (102) for producing electricity; a heating element (130) for heating the heat transfer fluid; a turbocharger (150) having at least one turbocharger turbine (151) and at least one turbocharger compressor (152), wherein said turbocharger compressor is (152) adapted to receive and pressurize the heat transfer fluid, and said turbocharger turbine (151) coupled to the turbocharger compressor (152), which receiving and expanding the heated compressed heat transfer fluid coming from the heating element (130) to drive the turbocharger compressor (152) and; a control unit (180) configured to control the solar power generating system (100) by comparing thermophysical properties obtained from sensors placed in different stages of the solar power generating system (100) with predetermined data into a control unit (180), wherein said solar power generating system (100) further comprises said generator (102) configured to work as a starter generator (102) for supplying power to operate the solar power generating system (100) at a start up mode; a power turbine (120) in communication with the inlet (181) of the solar power generating system (100), such that said power turbine (120) is configured to work as a compressor at start up mode wherein said power turbine (120) is configured to rotate the same speed of the starter generator (102) which is mechanically connected with said power turbine (120); and a compressor bypass valve (140) for controlling the flow rate of the heat transfer fluid and routing the heat transfer fluid to the heating element (130) by allowing the heat transfer fluid to bypass the compressor (152) at the start up mode.

In an embodiment of the present invention, the power turbine (120) provided at the inlet (181) of the solar power generating system (100) is connected with the starter generator (102) and can be located in a region before the heat transfer fluid enters the turbocharger compressor (152) in the solar power generating system (100). Referring to FIG. 1, installing the power turbine (120) at the inlet (181) of the solar power generating system (100) provides cold heat transfer fluid to generate power having several advantages, such that heat transfer fluid does not cause high thermal expansion and provides low clearance variation between hot and cold cases. The low temperature of the power turbine (120) can be referred as a creeping temperature which is approximately 0.4 times of the absolute melting temperature of the material from which the power turbine (120) is made. The temperature range in which creep deformation may occur differs in various materials such that said creeping temperature changes according to the material of the power turbine (120). The power turbine (120) can be aerodynamically coupled with different rotatable shafts of the power generator shaft (110) and shaft of the turbocharger that allows to run the turbocharger (150) at predetermined point and optimize the power turbine (120) for desired speed without using any reducer or gearbox. Said shafts can be used as a rotating machine elements, usually circular in cross section, for transmitting power from one part to another.

Using mass produced turbocharger (150) (i.e car turbocharger) makes the solar power generating system (100) cheaper and the heating element (130) can be optimized depending on the installation location and turbomachinery characteristics for the power generation.

According to the present invention, the power turbine (120) is configured to run as a compressor at predetermined low speeds which are below required electricity generation speed of the starter generator (102). Power required to rotate the power turbine (120) is supplied from the starter generator (102) until the starter generator reaches a predetermined speed corresponding to a predefined algorithm at the control unit at the start up mode. Moreover, the power turbine (120) can be mechanically connected with a power generator shaft (110) and aerodynamically coupled with the turbocharger (150).

Figure 2:
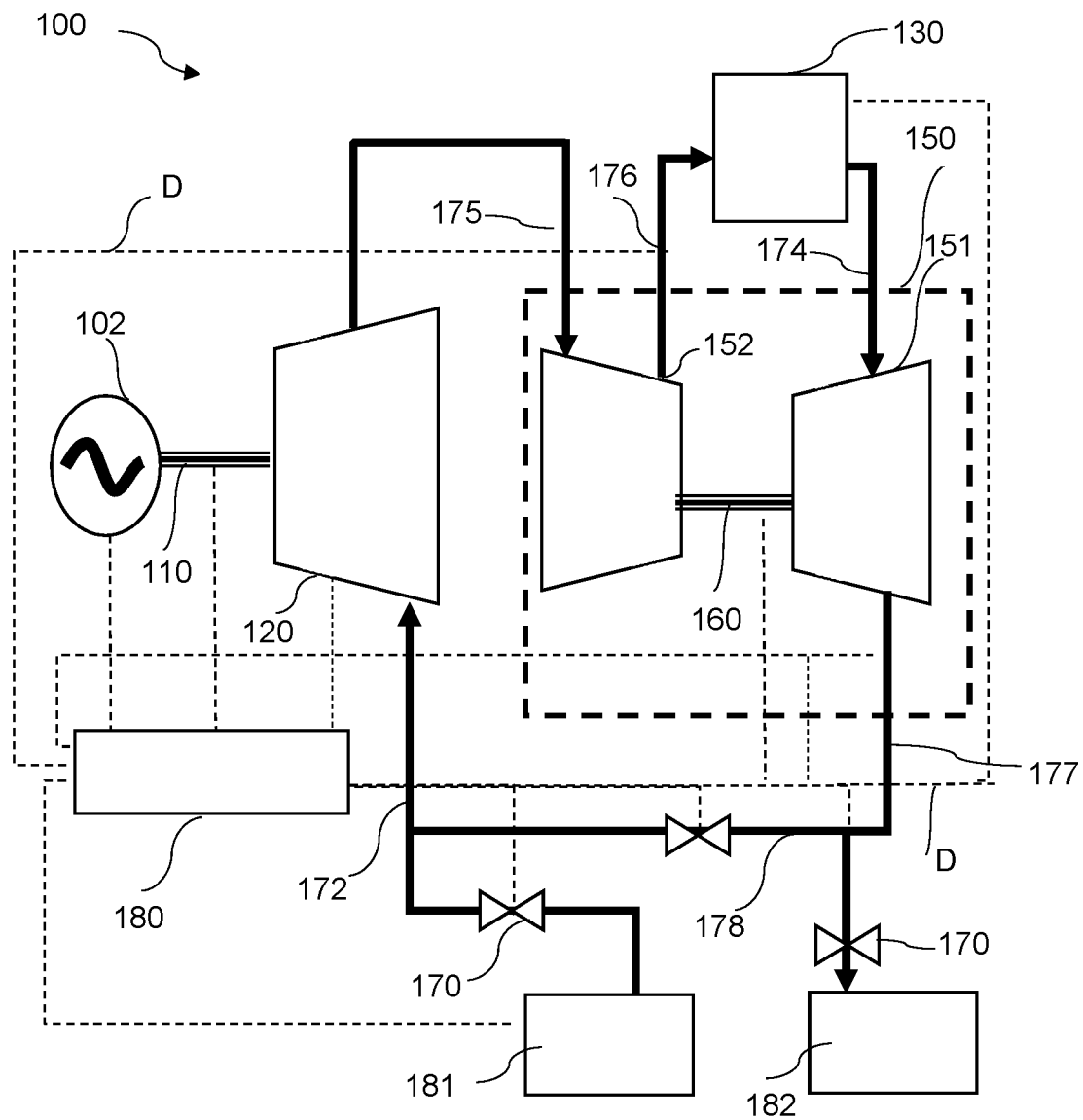
FIG. 2 illustrates a schematic view of the power generation mode according to the present invention.
Figure 3:
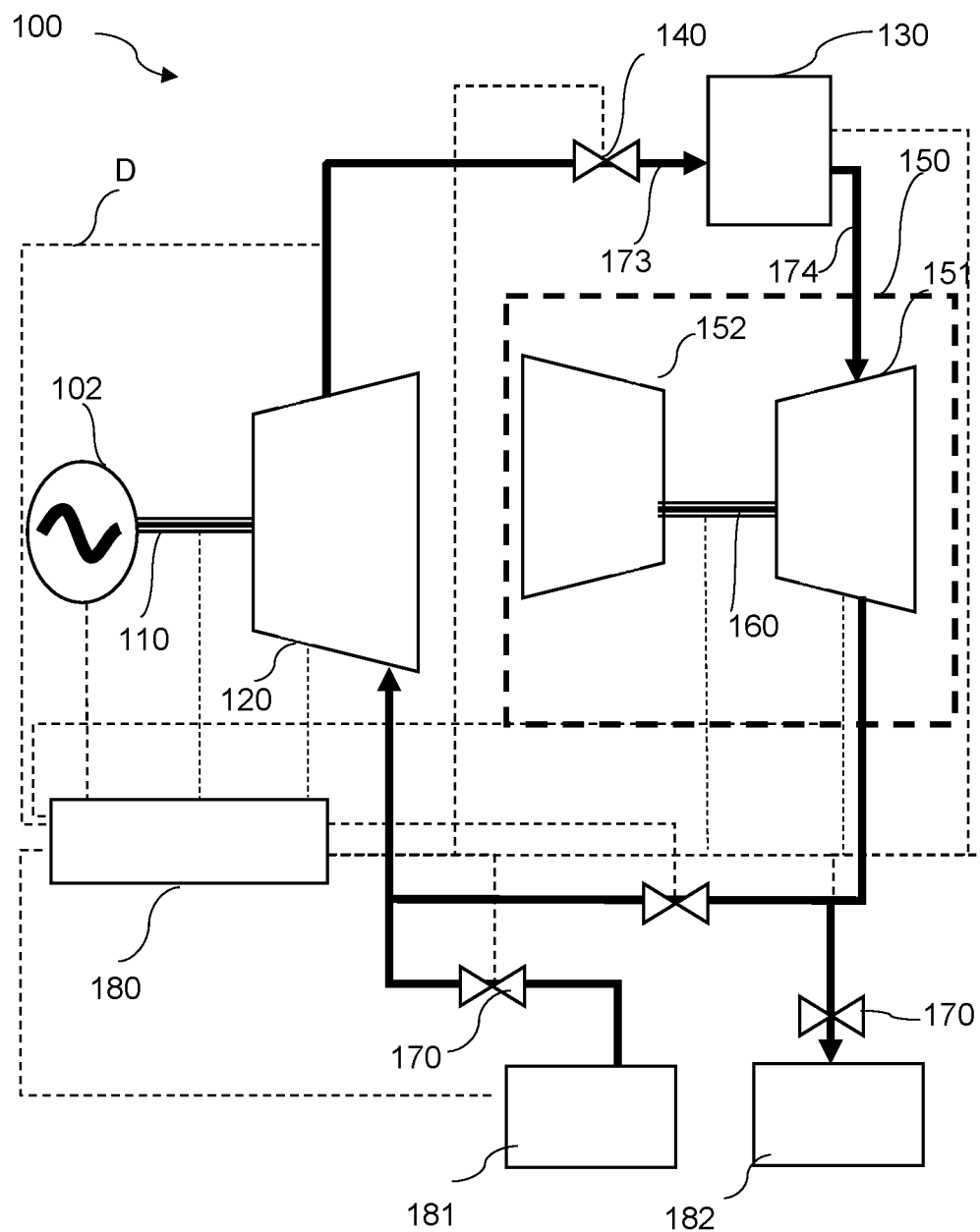
FIG. 3 illustrates a schematic view of the start up mode according to the present invention.

According to the present invention, the solar power generating system (100) also comprises pipes and cavities for transmitting the heat transfer fluid to more than one element of the solar power generating system (100) and also if required further comprising cooling the bearing lubrication oil among elements. As shown in FIG. 2 and FIG. 3, said pipes are used as a power turbine inlet pipe (172) to supply the heat transfer fluid to the power turbine (120); a heating element inlet pipe (173) is used to route the heat transfer fluid to the heating element (130) after discharged from the power turbine (120); a heating element outlet pipe (174) to route the heat transfer fluid to the turbocharger turbine (151); a turbocharger compressor inlet pipe (175) to transfer the heat transfer fluid from power turbine (120) to the turbocharger compressor (152); a turbocharger compressor outlet pipe (176) to transfer the heat transfer fluid from turbocharger compressor (152) to the heating element (130); a turbocharger turbine outlet pipe (177) to route the heat transfer fluid to the outlet (182), and a recirculation pipe (178) to recirculate flow to the power turbine (120) again.

According to the present invention, the turbocharger (150) comprises the turbocharger turbine (151) and the turbocharger compressor (152), wherein the turbocharger compressor (152) is adapted to receive and pressurize the heat transfer fluid and said turbocharger turbine (151) is coupled to the turbocharger compressor (152). Said turbocharger turbine (151) supplies sufficient power to drive the turbocharger compressor (152), likewise said turbocharger compressor (152) pressurizes the heat transfer fluid and then routes heat transfer fluid to the heating element (130). The heat transfer fluid coming from the power turbine outlet can be injected to either the heating element (130) or the turbocharger compressor (152) in the solar power generating system (100). Referring FIG. 4, upstream of the power turbine (120) heat transfer fluid can be premixed with a turbocharger turbine outlet for preheat before passing the heating element (130). In one embodiment, the turbocharger (150) further comprising a turbocharger shaft (160) for transmitting the power from the turbocharger turbine (151) to turbocharger compressor (152) as well.

Another feature of the invention is that the solar power generating system (100) comprises the compressor bypass valve (140), wherein said compressor bypass valve (140) can be a kind of a flow-regulating valve that primarily works at the start up mode, such that this valve allows the heat transfer fluid to bypass the compressor (152) and routes the heat transfer fluid directly to the heating element (130) at low speed of the turbocharger shaft (160), which are gradually closed with increasing turbocharger speed, and finally it is fully closed at power generation mode according to the present invention.

In different embodiments of the invention, the heating element (130) may be configured as a solar collector (130) for utilizing solar energy or a heat exchanger (130) configured to utilize of heat obtained from at least one external heat source; moreover, said heat exchanger (130) providing utilization of excess process heat from another system allows to increase temperature of heat transfer fluid in various industrial heat application processes. The solar power generating system (100) further can have a second heat exchanger positioned at an outlet of the heating element (130) and/or an outlet of the turbocharger turbine (151) for providing heat outside of the solar power generating system (100).

In another possible embodiment, said solar collector (130) can contain inner heat transfer enhancement material placed inside an absorber tube where the sun is focused on the solar collector for increasing the heat transfer rate to the heat transfer fluid and also this material can be such as metal foam, twisted types or inner fins.

Figure 5:
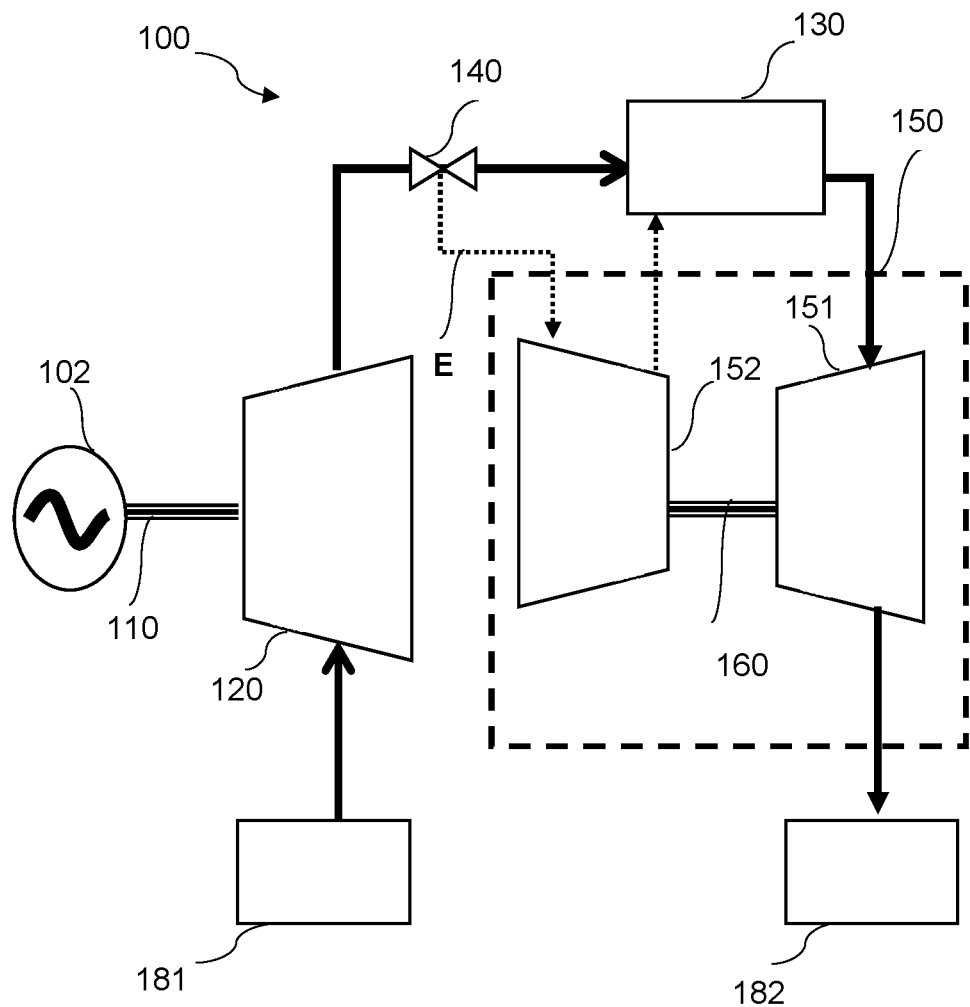
FIG. 5 illustrates the flow directions for heat transfer fluid in the start up mode according to the present invention.

A method of generating electricity and providing heat in the solar power generating system (100) comprising the start up mode and a power generation mode. In the start up mode, the starter generator (102) supplies required torque to the power generator shaft (110). The start up mode further comprises the steps of requiring electricity from battery or grid to the starter generator (102) to rotate the power turbine (120), increasing pressure of the heat transfer fluid to the power turbine (120) configured to work as a compressor at the start up mode, channeling the power turbine outlet heat transfer fluid to the heating element (130) to increase the temperature, routing the compressed heat transfer fluid heated by the heating element (130) to the turbocharger turbine (151) which drives the turbocharger compressor (152), controlling and adjusting a flow rate of the heat transfer fluid via at least one valve (170) continuously in the solar power generating system (100) by the control unit (180) as shown in FIG. 5 where the dashed line represents the fluid passing through the flow in small quantities and increases with increasing turbocharger shaft (160) speed by regulating compressor bypass valve (140). In the start up mode, for controlling the system, correlations can be generated using pressure, temperature and shaft speeds using the sensors installed at specific locations in the system.

Figure 4:
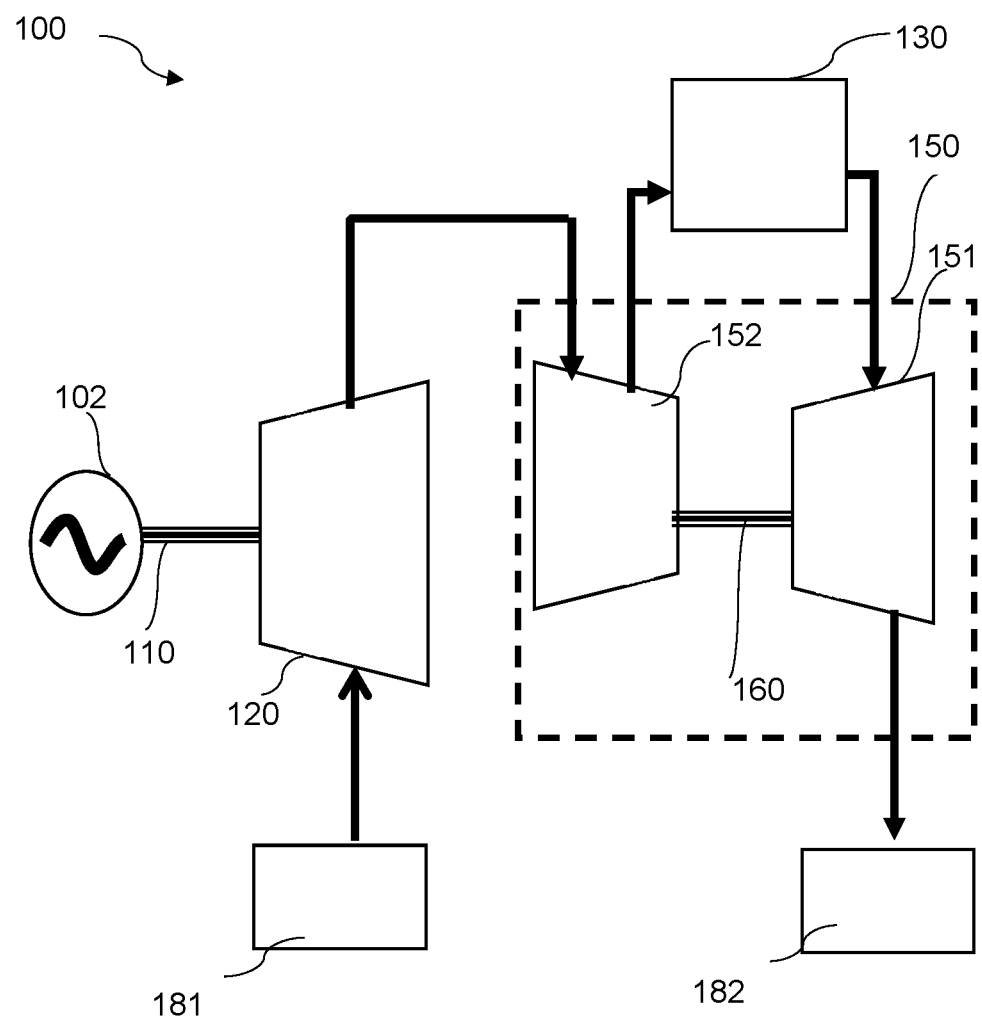
FIG. 4 illustrates the flow directions for heat transfer fluid in the power generation mode according to the present invention.

In power generation mode, referring to the FIG. 2 and FIG. 4, the heat transfer fluid passes through the power turbine (120) for electricity generation and driving pressure difference of the heat transfer fluid is the suction created by the turbocharger compressor (152) at the power turbine (120) outlet which is driven by the turbocharger turbine (151) coupled with the turbocharger shaft (160). Said power generation mode comprises the steps of passing heat transfer fluid through the power turbine (120) which causes to the power turbine (120) rotate, rotating the starter generator (102) by power turbine (120) to generate electricity, transferring the heat transfer fluid to the turbocharger compressor (152) for increasing the pressure, pressurizing the heat transfer fluid by the turbocharger compressor (152), channeling the heat transfer fluid by the turbocharger compressor outlet pipe (176) to the heating element (130) for increasing the temperature, directing the compressed heat transfer fluid heated by the heating element (130) to the turbocharger turbine (151), expanding the compressed heat transfer fluid heated by the heating element (130) in the turbocharger turbine (151) for driving the turbocharger compressor (152), controlling and adjusting a flow rate of the heat transfer fluid via at least one valve (170) continuously in the solar power generating system (100) by the control unit (180). In other words, rotational energy required for the starter generator (102) is provided by the power turbine (120) at the inlet of the solar power generating system (100) in power generating mode. After reaching of electricity generation speed limit of the starter generator (102), said starter generator (102) can convert to generate power and works as a power generator (102). For both start up and the power generation mode, a correlation can be generated for the solar power generating system (100) control using pressure and temperature sensors at specific locations.

The power generator shaft (110) further can be used to transmit power between the starter generator (102) and the power turbine (120) in the solar power generating system (100). The flow direction and the amount of heat transfer fluid can be controlled with the valves (170), nozzles and diffuser or such other similar functioning elements. According to the present invention, the solar power generating system (100) may comprise at least two bearings (171) located in the each power generator shaft (110) and turbocharger shaft (160) to support the rotating parts. Various elements locations such as bearings (171), the heating element outlet and the turbocharger turbine outlet can provide the excess heat, in which are utilized hot water or steam generation if desired by using heat exchanger or other heat transfer methods. In addition, heat transfer fluid can be directly ejected from the system for hot fluid use as explained above from the heating element outlet and the turbocharger turbine outlet.

According to the present invention, when the sun rises and DNI (Direct Normal Insolation) passes the limiting value for the start up mode, the solar collector (130) starts orienting by the grid power or a battery. After tracking starts, the starter generator (102) powers, the power turbine (120); majority of the fluid is routed directly to the solar collector (130) passing through the compressor bypass valve (140), the gradually temperature of the heat transfer fluid discharged from a solar collector (130) rises. For preventing the excess suction or possible turbocharger damage, partially heat transfer fluid also can be sent to the turbocharger compressor (152) for pressure balance. The heat transfer fluid discharged from the solar collector passes through the turbocharger turbine (151); moreover, some amount of the heat transfer fluid outlet from turbine (151) can route to the turbocharger compressor (152) and/or power turbine (120) for preheating.

In another embodiment of the system, the control unit (180) is configured to control the solar power generating system (100) by comparing thermophysical properties obtained from sensors placed in the solar power generating system (100) with predetermined data into the control unit (180). Thermophysical properties can be simply defined as material properties that vary with temperature without altering the material's chemical identity such that said sensors can vary according to the desired amount and type. By obtaining data of temperature, pressure, humidity, direct normal irradiance (DNI), wind of ambient condition, speed of shafts and supplied or generated electricity values such as current, voltage or phase; the control unit (180) actuates valves (170) and other controllable elements for operating the system in desired conditions. In different embodiments, said control unit (180) can also regulate the tracking of the solar collector (130) or an additional controller can be used for tracking the sun. The starter generator (102) and valves (170) can be used in controlling mass flow, by reading temperature and pressure sensor obtaining data from the heating element inlet and outlet when compare with predetermined values centered in control unit (180).

According to the present invention, the solar power generating system (100) can be designed as an open or closed cycle. As an open cycle of both start up and power generation modes; in the last step, ambient air used as heat transfer fluid exits the turbocharger turbine (151) and leaves the solar power generating system (100) from the outlet (182). A new fresh heat transfer fluid is being fed from the power turbine (120) for a new cycle. The heat transfer fluid discharged from the turbocharger turbine (151) is disposed to ambient at the outlet (182) or partly routed to power turbine inlet pipe (172) of the solar power generating system (100) according to the different embodiments of the invention. During operation, as an open cycle, solar power generating system (100) can dispose all the heat transfer fluid to outlet (182), or recirculate all the heat transfer fluid to the power turbine (120) via recirculation pipe (178) or partially dispose and partially recirculate. On the contrary, as the close cycle design of both start up and power generation modes, the heat transfer fluid coming from the turbocharger turbine outlet is routed to directly power turbine inlet for a continuous process. The heat transfer fluid might be any of compressible fluid such as air, a non corrosive and non-flammable gas if the system is close cycle.

In a further embodiment of the present invention, which does not contain combustor, heat transfer fluid can be recirculated, which allows to operate as close cycle, even solar power generating system (100) is designed as an open cycle using valve (170).

The said solar power generating system (100) and method can be applied to residential, industrial applications as on or off-grid conditions. Electrical grids are an interconnected network for delivering electricity from producers to consumers.

The invention claimed is:

1. A solar power generating system for generating electricity and providing heat comprising:
at least one generator for generating the electricity;
a heating element for heating a heat transfer fluid, wherein the heating element comprises a solar collector and the solar collector is connected between at least one turbocharger turbine and at least one turbocharger compressor;
a turbocharger comprising the at least one turbocharger turbine and the at least one turbocharger compressor, wherein the at least one turbocharger compressor is adapted to receive and pressurize the heat transfer fluid, and the at least one turbocharger turbine is coupled to the at least one turbocharger compressor, wherein the at least one turbocharger turbine is configured to receive the heat transfer fluid coming from the heating element to drive the at least one turbocharger compressor;
a control unit configured to control the solar power generating system by comparing thermophysical properties obtained from more than one sensor placed in the solar power generating system with predetermined data in the control unit, wherein
the at least one generator is configured as a starter generator for supplying a power to operate a power turbine at a start up mode, wherein the start up mode is an intermediate transition stage between a stationary state of the solar power generating system and a power generation mode;

the power turbine is in communication with an inlet of the solar power generating system, wherein the power turbine is configured to work as a compressor at the start up mode, wherein the power turbine is configured to rotate with the at least one generator, wherein the starter generator is mechanically connected with the power turbine; and a compressor bypass valve comprising an input coupled to the power turbine, a first output coupled to the heating element, and a second output coupled to the at least one turbocharger compressor, wherein the compressor bypass valve is configured for controlling a flow rate of the heat transfer fluid, routing the heat transfer fluid to the heating element by allowing the heat transfer fluid to bypass the at least one turbocharger compressor at an initialization of the start up mode, and increasing an amount of the heat transfer fluid routed to the at least one turbocharger compressor during the startup mode subsequent to said initialization.

2. The solar power generating system according to claim 1, wherein the starter generator is configured to supply the power to the power turbine until the starter generator reaches a predetermined speed corresponding to a predefined algorithm in the control unit at the start up mode.

3. The solar power generating system according to claim 2, wherein the power turbine provided at the inlet of the solar power generating system is connected with the starter generator and located in a region before the heat transfer fluid enters the at least one turbocharger compressor.

4. The solar power generating system according to claim 3, wherein the heating element further comprises a heat transfer enhancement material.

5. The solar power generating system according to claim 4, wherein the heat transfer enhancement material is a foam made of a metal.

6. The solar power generating system according to claim 3, wherein the heat transfer fluid is an ambient air.

7. The solar power generating system according to claim 1, wherein the heat transfer fluid routed from a power turbine outlet is injected to either the heating element or the at least one turbocharger compressor in the solar power generating system.

8. The solar power generating system according to claim 1, wherein the solar power generating system is configured to recirculate the heat transfer fluid to the power turbine.

9. The solar power generating system according to claim 1, further comprising a second heat exchanger positioned at an outlet of the heating element and/or an outlet of the at least one turbocharger turbine for providing the heat outside of the solar power generating system.

10. The solar power generating system according to claim 1, wherein the heat transfer fluid is a non-corrosive and non-flammable gas.

11. The solar power generating system according to claim 1, wherein the power turbine is mechanically connected with a power generator shaft and aerodynamically coupled with the turbocharger.

12. The solar power generating system according to claim 1, further comprising pipes and cavities for transmitting the heat transfer fluid to more than one element of the solar power generating system.

13. The solar power generating system according to claim 1, wherein the solar power generating system is configured to generate the electricity for an electrical grid.

14. A method of generating electricity and providing heat in a solar power generating system, comprising a start up mode and a power generation mode, wherein the start up mode comprises the steps of:

requiring power from a battery or a grid to supply the power to a starter generator to rotate a power turbine;

increasing a pressure of a heat transfer fluid using the power turbine configured to work as a compressor at the start up mode to obtain a compressed heat transfer fluid;

channeling the compressed heat transfer fluid to a heating element comprising a solar collector to increase a temperature of the compressed heat transfer fluid, wherein said channeling comprises causing the compressed heat transfer fluid to bypass a turbocharger compressor at a compressor bypass valve at an initialization of the startup mode;

routing the compressed heat transfer fluid heated by the heating element to a turbocharger turbine, wherein the turbocharger turbine drives the turbocharger compressor and converts the compressed heat transfer fluid into an expanded heat transfer fluid for recycling to the power turbine;

controlling and adjusting a flow rate of the compressed heat transfer fluid via at least one valve comprising the compressor bypass valve continuously in the solar power generating system by a control unit, wherein the controlling and adjusting comprises increasing an amount of the compressed heat transfer fluid routed from the compressor bypass valve to the turbocharger compressor during the startup mode subsequent to said initialization;

wherein the power generation mode comprises the steps of:

passing the recycled heat transfer fluid through the power turbine causing the power turbine to rotate;

rotating the starter generator by the power turbine to generate the electricity;

transferring the heat transfer fluid passed through the power turbine to the turbocharger compressor for increasing the pressure of the heat transfer fluid passed through the power turbine;

pressurizing the heat transfer fluid passed through the power turbine by the turbocharger compressor to obtain turbocharger compressed heat transfer fluid;

channeling the turbocharger compressed heat transfer fluid to the heating element for increasing the temperature of the turbocharger compressed heat transfer fluid;

directing the turbocharger compressed heat transfer fluid heated by the heating element to the turbocharger turbine;

expanding the turbocharger compressed heat transfer fluid heated by the heating element in the turbocharger turbine for driving the turbocharger compressor;

controlling and adjusting a flow rate of the turbocharger compressed heat transfer fluid via the at least one valve continuously in the solar power generating system by the control unit.

15. The method according to claim 14, wherein the start up mode further comprises the step of discharging the heat transfer fluid by partially transferring the heat transfer fluid to the turbocharger compressor for compensating an excess suction, wherein the excess suction is determined by predetermined data in the control unit.

16. The method according to claim 14, further comprising the step of recirculating, at least partially, the heat transfer fluid from a turbocharger turbine outlet to a power turbine inlet.

17. The method according to claim 14, further comprising the step of providing the heat in the solar power generating system by directly ejecting the heat transfer fluid from a heating element outlet and/or a turbocharger turbine outlet for providing the heat for external applications requiring use of the heat.

18. The method according to claim 14, further comprising the step of providing the heat in the solar generating system by using a heat exchanger disposed at a heating element outlet and/or a turbocharger turbine outlet for providing the heat for external applications requiring use of the heat.

\* \* \* \* \*